US010998563B2

United States Patent
Kato et al.

(10) Patent No.: US 10,998,563 B2
(45) Date of Patent: May 4, 2021

(54) FUEL GAS INJECTION DEVICE AND FUEL CELL SYSTEM

(71) Applicant: HONDA MOTOR CO., LTD., Tokyo (JP)

(72) Inventors: Koichi Kato, Wako (JP); Tomohiko Hatakeda, Wako (JP); Kazuya Mizumoto, Wako (JP); Tetsuya Fukuda, Wako (JP); Hiroyasu Ozaki, Wako (JP); Yoichiro Saito, Mito (JP)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 16/364,346

(22) Filed: Mar. 26, 2019

(65) Prior Publication Data

US 2019/0305338 A1   Oct. 3, 2019

(30) Foreign Application Priority Data

Mar. 28, 2018   (JP) .............................. JP2018-061678

(51) Int. Cl.
  *H01M 8/04082*   (2016.01)
  *H01M 8/04746*   (2016.01)
(52) U.S. Cl.
  CPC ... *H01M 8/04201* (2013.01); *H01M 8/04753* (2013.01)

(58) Field of Classification Search
  None
  See application file for complete search history.

(56) References Cited

FOREIGN PATENT DOCUMENTS

| JP | 2011179333 A | * | 9/2011 |
| JP | 2014-154385 | | 8/2014 |

OTHER PUBLICATIONS

Machine translation of Fukuma et al. JP 2011179333A (Year: 2011).*

* cited by examiner

*Primary Examiner* — Wojciech Haske
(74) *Attorney, Agent, or Firm* — Amin, Turocy & Watson, LLP (57) ABSTRACT

A fuel gas injection device of a fuel cell system includes an ejector having a nozzle that generates a negative pressure by discharging a fuel gas injected respectively from a plurality of injectors so as to draw-in a fuel exhaust gas discharged from a fuel cell stack and mix the fuel exhaust gas with the fuel gas. A total orifice equivalent diameter obtained by adding together orifice equivalent diameters of respective injection holes of the plurality of injectors and an orifice equivalent diameter of an injection hole of the nozzle are set such that $S_E < S_T$.

20 Claims, 4 Drawing Sheets

FUEL GAS INJECTION DEVICE AND FUEL CELL SYSTEM

CROSS-REFERENCE TO RELATED APPLICATION

This application is based upon and claims the benefit of priority from Japanese Patent Application No. 2018-061678 filed on Mar. 28, 2018, the contents of which are incorporated herein by reference.

BACKGROUND OF THE INVENTION

Field of the Invention

The present invention relates to a fuel gas injection device disposed on a fuel gas supply path for supplying a fuel gas to a fuel cell, and to a fuel cell system.

Description of the Related Art

For example, in Japanese Laid-Open Patent Publication No. 2014-154385, FIG. 14 discloses a fuel gas injection device having two injectors arranged in parallel to each other and an ejector disposed downstream of the injectors. The ejector includes a nozzle that generates a negative pressure by discharging the fuel gas injected from each injector so as to draw-in a fuel exhaust gas emitted from a fuel cell and mix it with the fuel gas.

SUMMARY OF THE INVENTION

In such a fuel gas injection device, it is necessary to appropriately set the relation between the diameter of the injection hole of each of the plurality of injectors and the diameter of the injection hole of the nozzle of the ejector in order to achieve enhanced circulation efficiency of the fuel exhaust gas. However, the conventional art above makes no mention of the relation between the diameter of the injection hole of each injector and the diameter of the injection hole of the nozzle.

The present invention has been made by considering such a problem, and an object of the present invention is to provide a fuel gas injection device and a fuel cell system that are capable of improving the circulation efficiency of the fuel exhaust gas.

In order to achieve the object above, a fuel gas injection device according to the present invention is disposed on a fuel gas supply path for supplying a fuel gas to a fuel cell, and the fuel gas injection device includes: a plurality of injectors arranged in parallel to each other; and an ejector including a nozzle that generates a negative pressure by discharging the fuel gas injected respectively from the plurality of injectors so as to draw-in a fuel exhaust gas discharged from the fuel cell and mix the fuel exhaust gas with the fuel gas. A total orifice equivalent diameter $S_T$ obtained by adding together orifice equivalent diameters of respective injection holes of the plurality of injectors and an orifice equivalent diameter $S_E$ of an injection hole of the nozzle are set such that $S_E < S_T$.

According to the configuration above, since $S_E < S_T$, it is possible to make the pressure of the fuel gas on the downstream side of the nozzle effectively lower than the pressure of the fuel gas on the upstream side of the nozzle. Thus, the gas flow speed passing through the nozzle can be the speed of sound, and the circulation efficiency of the fuel exhaust gas can be improved.

The fuel gas injection device above may further include an injector control unit configured to control operations of the plurality of injectors such that the fuel gas is injected simultaneously from the plurality of injectors.

According to the configuration above, it is possible to efficiently supply a necessary amount of fuel gas to the fuel cell.

A fuel gas injection device according to the present invention is disposed on a fuel gas supply path for supplying a fuel gas to a fuel cell, and the fuel gas injection device includes: a plurality of injectors arranged in parallel to each other; and an ejector including a nozzle that generates a negative pressure by discharging the fuel gas injected respectively from the plurality of injectors so as to draw-in a fuel exhaust gas discharged from the fuel cell and mix the fuel exhaust gas with the fuel gas. An orifice equivalent diameter $S_A$ of an injection hole of each of the plurality of injectors and an orifice equivalent diameter $S_E$ of an injection hole of the nozzle are set such that $S_E < S_A$.

According to the configuration above, since $S_E < S_A$, the pressure of the fuel gas on the downstream side of the nozzle can be effectively higher than the pressure of the fuel gas on the upstream side of the nozzle. Then, the gas flow speed passing through the nozzle can be the speed of sound, and the circulation efficiency of the fuel exhaust gas is improved.

The fuel gas injection device above may further include an injector control unit configured to control operations of the plurality of injectors such that the fuel gas is injected intermittently from the plurality of injectors in an alternate manner, once at a time or multiple times at a time.

In the fuel gas injection device above, flow paths respectively from the plurality of injectors to the nozzle may be configured such that lengths and flow path sectional areas are substantially identical to each other.

According to the configuration above, it is possible to reduce variation in pressure loss of the fuel gas respectively from the plurality of injectors to the nozzle.

In the fuel gas injection device above, the ejector may include: a diffuser disposed downstream of the nozzle; and a draw-in portion for guiding the fuel exhaust gas into a space between the nozzle and the diffuser.

According to the configuration above, it is possible to supply the fuel gas and fuel exhaust gas efficiently to the fuel cell.

A fuel cell system according to the present invention includes a fuel cell, a fuel gas supply path for supplying a fuel gas to the fuel cell, and the above-described fuel gas injection device disposed on the fuel gas supply path.

According to the configuration above, it is possible to obtain a fuel cell system that offers the same effects as the above-described fuel gas injection device.

According to the present invention, it is possible to make the pressure of the fuel gas on the downstream side of the nozzle effectively higher than the pressure of the fuel gas on the upstream side of the nozzle. The gas flow speed passing through the nozzle can then be the speed of sound and the circulation efficiency of the fuel exhaust gas is improved.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The fuel gas injection device and fuel cell system according to the present invention will now be described referring to the accompanying drawings in conjunction with preferred embodiments.

Figure 1:
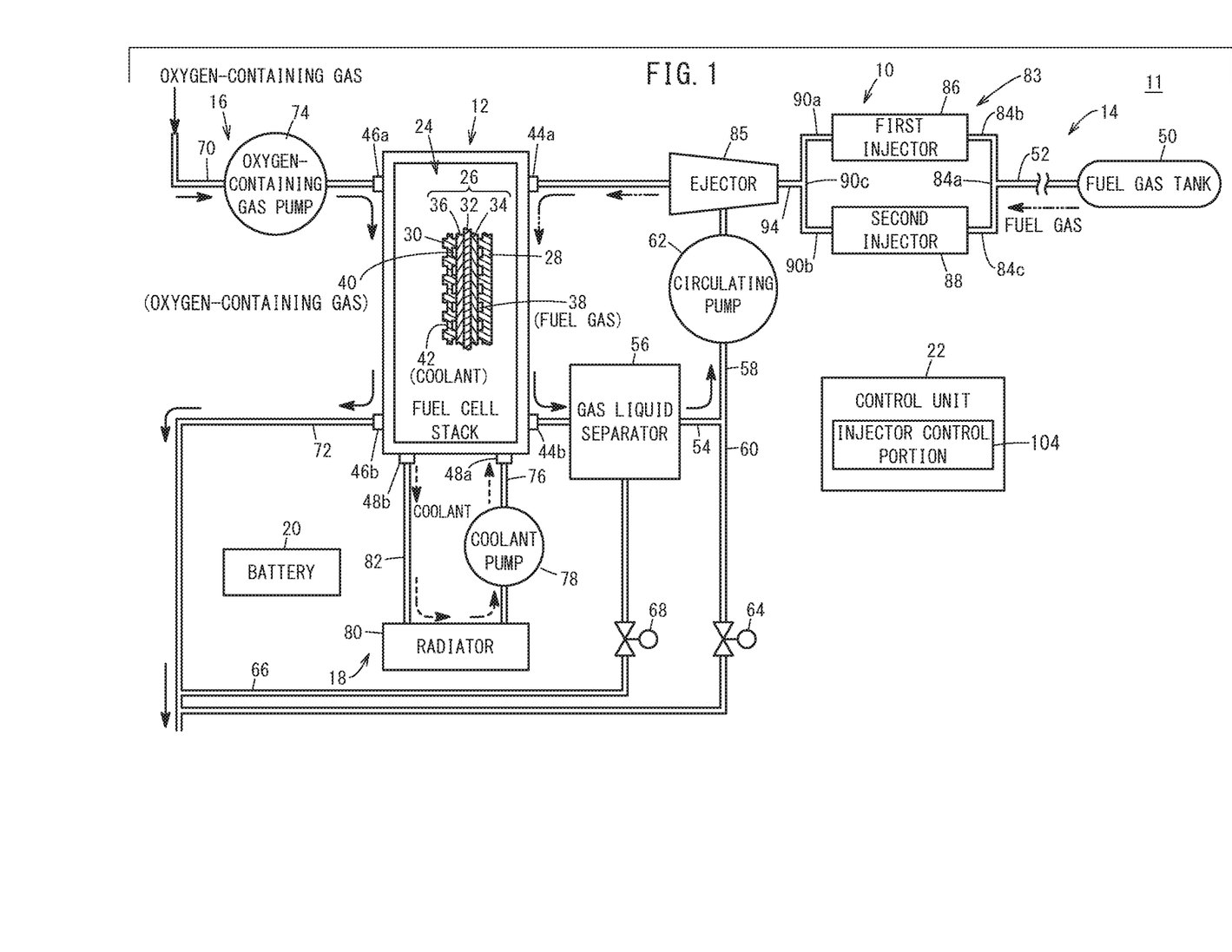
FIG. 1 is a schematic explanatory diagram showing the configuration of a fuel cell system having a fuel gas injection device according to an embodiment of the present invention.

As shown in FIG. 1, a fuel cell system 11 according to an embodiment of the present invention is mounted on a fuel cell vehicle (not shown) such as a fuel-cell electric vehicle or the like, for example.

The fuel cell system 11 includes a fuel cell stack 12 (fuel cell). The fuel cell stack 12 is provided with a fuel gas supply device 14 for supplying a fuel gas, e.g. hydrogen gas, an oxygen-containing gas supply device 16 for supplying an oxygen-containing gas, e.g. the air, and a coolant supply device 18 for supplying a coolant. The fuel cell system 11 further includes a battery 20 as an energy storage device and a control unit 22.

In the fuel cell stack 12, a plurality of power generation cells 24 are stacked in a horizontal direction or vertical direction. The power generation cell 24 includes a membrane electrode assembly 26 sandwiched between a first separator 28 and a second separator 30. The first separator 28 and the second separator 30 are made of a metal separator or carbon separator.

The membrane electrode assembly 26 includes a solid polymer electrolyte membrane 32 as a thin membrane of perfluorosulfonic acid containing water, for example, and an anode 34 and a cathode 36 holding the solid polymer electrolyte membrane 32 therebetween. The solid polymer electrolyte membrane 32 is made of a fluorine-based electrolyte, or an HC (hydrocarbon) based electrolyte.

A fuel gas flow field 38 for guiding the fuel gas to the anode 34 is provided between the first separator 28 and the membrane electrode assembly 26. An oxygen-containing gas flow field 40 for supplying the oxygen-containing gas to the cathode 36 is provided between the second separator 30 and the membrane electrode assembly 26. A coolant flow field 42 for passing the coolant (cooling medium) is provided between mutually adjacent first separator 28 and second separator 30.

The fuel cell stack 12 has a fuel gas inlet 44a, a fuel gas outlet 44b, an oxygen-containing gas inlet 46a, an oxygen-containing gas outlet 46b, a coolant inlet 48a, and a coolant outlet 48b. The fuel gas inlet 44a passes through each power generation cell 24 in the stacking direction and communicates with the supply side of the fuel gas flow field 38. The fuel gas outlet 44b passes through each power generation cell 24 in the stacking direction and communicates with the discharge side of the fuel gas flow field 38. The fuel gas flow field 38, fuel gas inlet 44a, and fuel gas outlet 44b constitute an anode flow field.

The oxygen-containing gas inlet 46a passes through each power generation cell 24 in the stacking direction and communicates with the supply side of the oxygen-containing gas flow field 40. The oxygen-containing gas outlet 46b passes through each power generation cell 24 in the stacking direction and communicates with the discharge side of the oxygen-containing gas flow field 40. The oxygen-containing gas flow field 40, oxygen-containing gas inlet 46a, and oxygen-containing gas outlet 46b constitute a cathode flow field.

The coolant inlet 48a passes through each power generation cell 24 in the stacking direction and communicates with the supply side of the coolant flow field 42. The coolant outlet 48b passes through each power generation cell 24 in the stacking direction and communicates with the discharge side of the coolant flow field 42.

The fuel gas supply device 14 includes a fuel gas tank 50 storing a high-pressure fuel gas (high pressure hydrogen). The fuel gas in the fuel gas tank 50 is supplied to the fuel gas inlet 44a of the fuel cell stack 12 through a fuel gas supply path 52 and a fuel gas injection device 10. A specific configuration of the fuel gas injection device 10 will be described later.

A fuel gas discharge path 54 communicates with the fuel gas outlet 44b of the fuel cell stack 12. The fuel gas discharge path 54 discharges a fuel exhaust gas (fuel off-gas) from the fuel cell stack 12, where the fuel exhaust gas is the fuel gas which has been at least partially used at the anode 34. A gas-liquid separator 56 is disposed on the fuel gas discharge path 54.

A circulation flow path 58 and a purge flow path 60 are connected to a downstream end of the fuel gas discharge path 54. The circulation flow path 58 guides the fuel exhaust gas to the fuel gas injection device 10. A circulating pump 62 is disposed on the circulation flow path 58. The circulating pump 62 makes the fuel exhaust gas discharged into the fuel gas discharge path 54 circulate to the fuel gas supply path 52 through the circulation flow path 58, especially at the time of starting up of the fuel cell stack 12.

A purge valve 64 is provided on the purge flow path 60. Connected to a bottom portion of the gas-liquid separator 56 is one end of a drainage flow path 66 for discharging fluid mainly containing liquid components. A drain valve 68 is provided on the drainage flow path 66.

The oxygen-containing gas supply device 16 includes an oxygen-containing gas supply path 70 communicating with the oxygen-containing gas inlet 46a of the fuel cell stack 12, and an oxygen-containing gas discharge path 72 communicating with the oxygen-containing gas outlet 46b of the fuel cell stack 12.

An oxygen-containing gas pump 74 for compressing and supplying an oxygen-containing gas (the air from the atmosphere) is provided on the oxygen-containing gas supply path 70. The oxygen-containing gas supply path 70 introduces the oxygen-containing gas into the fuel cell stack 12, and the oxygen-containing gas discharge path 72 discharges an exhaust oxygen-containing gas from the fuel cell stack 12, where the exhaust oxygen-containing gas is the oxygen-containing gas which has been at least partially used at the cathode 36.

The coolant supply device 18 includes a coolant supply path 76 connected to the coolant inlet 48a of the fuel cell stack 12. A coolant pump 78 is disposed on the coolant supply path 76. The coolant supply path 76 is connected to a radiator 80, and a coolant discharge path 82 communicating with the coolant outlet 48b is connected to the radiator 80.

Figure 2:
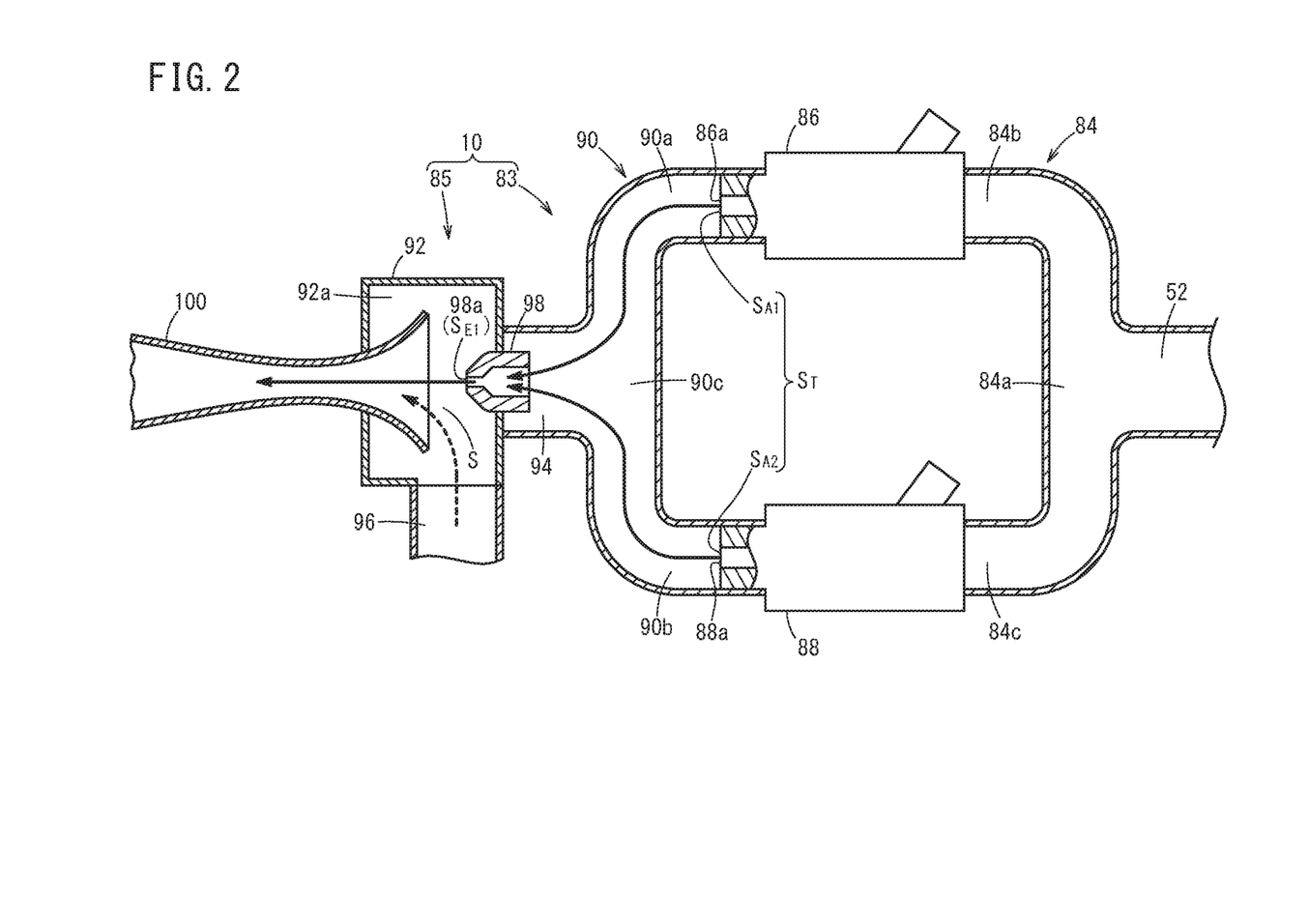
FIG. 2 is a schematic explanatory diagram showing the configuration of the fuel gas injection device.

The fuel gas injection device 10 is disposed on the fuel gas supply path 52. As shown in FIG. 2, the fuel gas injection device 10 includes an injector device 83 and an ejector 85. The injector device 83 includes an introducing portion 84, a first injector 86, a second injector 88, and a sending out portion 90.

The introducing portion 84 includes a branching portion 84a, a first introducing path 84b, and a second introducing path 84c. The fuel gas guided from the fuel gas supply path 52 flows into the branching portion 84a. The first introducing path 84b connects the branching portion 84a and the first injector 86, so as to guide the fuel gas from the branching portion 84a to the first injector 86. The second introducing path 84c. connects the branching portion 84a and the second injector 88, so as to guide the fuel gas from the branching portion 84a to the second injector 88.

The sending out portion 90 includes a first sending out path 90a, a second sending out path 90b, and a junction portion 90c. The first sending out path 90a connects the first injector 86 and the junction portion 90c, so as to guide the fuel gas injected from the first injector 86 to the junction portion 90c. The second sending out path 90b connects the second injector 88 and the junction portion 90c, so as to guide the fuel gas injected from the second injector 88 to the junction portion 90c.

The first injector 86 and the second injector 88 are arranged in parallel to each other. The first injector 86 injects the fuel gas guided from the first introducing path 84b into the first sending out path 90a. The first injector 86 has a first injection hole 86a for injecting the fuel gas.

Though not shown in detail graphically, the first injector 86 includes a needle valve for opening and closing a flow path formed in the injector main body, and a coil (solenoid) for operating the needle valve. The first injector 86 opens as a current is passed to the coil, and closes as the current to the coil is cut off.

The second injector 88 injects the fuel gas guided from the second introducing path 84c. into the second sending out path 90b. The second injector 88 has a second injection hole 88a for injecting the fuel gas. The second injector 88 is configured in the same manner as the first injector 86.

The ejector 85 includes a hollow body 92, an inlet portion 94, a draw-in portion 96, a nozzle 98, and a diffuser 100. The inlet portion 94 communicates with the junction portion 90c and guides the fuel gas from the junction portion 90c to the nozzle 98. The draw-in portion 96 communicates with the circulation flow path 58 and guides the fuel exhaust gas from the circulation flow path 58 to an inner hole 92a of the body 92.

The nozzle 98 is provided to the body 92, so as to discharge the fuel gas in the inlet portion 94 into the inner hole 92a of the body 92. The nozzle 98 has a third injection hole 98a for injecting the fuel gas. The diffuser 100 has an upstream opening facing to the third injection hole 98a of the nozzle 98. A given space S is formed between the diffuser 100 and nozzle 98. The fuel gas and fuel exhaust gas sent out from the diffuser 100 is guided to the fuel gas inlet 44a (see FIG. 1).

A total orifice equivalent diameter $S_T$ obtained by adding together an orifice equivalent diameter $S_{A1}$ of the first injection hole 86a and an orifice equivalent diameter $S_{A2}$ of the second injection hole 88a, and an orifice equivalent diameter $S_{E1}$ of the third injection hole 98a are set such that $S_{E1} < S_T$. The orifice equivalent diameter $S_{A1}$ corresponds to the opening area of the first injection hole 86a multiplied by a flow coefficient of the first injector 86. The orifice equivalent diameter $S_{A2}$ corresponds to the opening area of the second injection hole 88a multiplied by a flow coefficient of the second injector 88. The orifice equivalent diameter $S_{E1}$ corresponds to the opening area of the third injection hole 98a multiplied by a flow coefficient of the nozzle 98.

Each of the orifice equivalent diameter $S_{A1}$ and orifice equivalent diameter $S_{A2}$ is larger than the orifice equivalent diameter $S_{E1}$. However, note that at least one of the orifice equivalent diameter $S_{A1}$ and the orifice equivalent diameter $S_{A2}$ may be smaller than the orifice equivalent diameter $S_{E1}$. Further, the orifice equivalent diameter $S_{A1}$ and the orifice equivalent diameter $S_{A2}$ may be equal to each other or different from each other.

In such a fuel gas injection device 10, a flow path length of the first sending out path 90a is substantially equal to a flow path length of the second sending out path 90b. A flow path sectional area of the first sending out path 90a is substantially equal to a flow path sectional area of the second sending out path 90b. That is, the pressure loss of the fuel gas flowing in the first sending out path 90a is substantially equal to the pressure loss of the fuel gas flowing in the second sending out path 90b. Also, the fuel gas injected from the first injector 86 and the fuel gas injected from the second injector 88 are mixed together at the junction portion 90c and introduced to the nozzle 98 through the inlet portion 94. Accordingly, the length of the flow path and the flow path sectional area from the first injector 86 to the nozzle 98 are substantially equal to the length of the flow path and the flow path sectional area from the second injector 88 to the nozzle 98.

In FIG. 1, the control unit 22 is a computer including a microcomputer, which is composed of a CPU (Central Processing Unit), ROM, RAM as memory, and so on. The control unit 22 functions as a various functions realizing portion (function realizing means) as the CPU reads and executes programs stored in the ROM. The various functions realizing portion can also be constructed by using function realizing apparatus as hardware.

The control unit 22 controls the amount of power generation of the fuel cell stack 12 based on the power required by a load. The control unit 22 includes an injector control portion 104 that is configured to control operations of the first injector 86 and second injector 88 such that the first injector 86 and second injector 88 inject the fuel gas simultaneously.

Operation of the fuel cell system 11 thus configured will be described below.

In the fuel gas supply device 14, the fuel gas is supplied from the fuel gas tank 50 to the fuel gas supply path 52. At this time, the injector control portion 104 applies an opening control to both of the first injector 86 and the second injector 88. The fuel gas injected from the first injector 86 into the first sending out path 90a and the fuel gas injected from the second injector 88 into the second sending out path 90b join together at the junction portion 90c.

Then, the fuel gas flows from the junction portion 90c to the nozzle 98 through the inlet portion 94, and is discharged from the nozzle 98 to the diffuser 100. The fuel gas discharged to the diffuser 100 is introduced from the fuel gas inlet 44a into the fuel gas flow field 38, moves along the fuel gas flow field 38 to be supplied to the anode 34 of the membrane electrode assembly 26.

In the oxygen-containing gas supply device 16, the oxygen-containing gas is sent to the oxygen-containing gas supply path 70 under a rotation action of the oxygen-containing gas pump 74. The oxygen-containing gas is introduced from the oxygen-containing gas inlet 46a into the oxygen-containing gas flow field 40, moves along the oxygen-containing gas flow field 40, to be supplied to the cathode 36 of the membrane electrode assembly 26.

Thus, at each membrane electrode assembly 26, the fuel gas supplied to the anode 34 and the oxygen in the oxygen-containing gas supplied to the cathode 36 are consumed by electrochemical reactions at the electrode catalyst layers so as to produce power.

Further, in the coolant supply device 18, under the action of the coolant pump 78, a coolant, such as pure water, ethylene glycol, oil, or the like, is supplied from the coolant supply path 76 to the coolant inlet 48a of the fuel cell stack 12. The coolant flows along the coolant flow field 42, cools the power generation cell 24, and is discharged from the coolant outlet 48b to the coolant discharge path 82.

Next, the fuel gas supplied to the anode 34 and partially consumed is discharged as the fuel exhaust gas from the fuel gas outlet 44b to the fuel gas discharge path 54. The fuel exhaust gas flows from the fuel gas discharge path 54 to the circulation flow path 58, and is introduced into the draw-in portion 96 of the ejector 85. The fuel exhaust gas introduced into the draw-in portion 96 is drawn into the space S between the diffuser 100 and the nozzle 98 by the action of the negative pressure generated as the fuel gas is discharged from the nozzle 98 into the diffuser 100, and the fuel exhaust gas is mixed with the fuel gas.

The fuel exhaust gas discharged to the fuel gas discharge path 54 is discharged (purged) to the outside as needed, under a releasing action of the purge valve 64. Similarly, the oxygen-containing gas supplied to the cathode 36 and partially consumed is discharged from the oxygen-containing gas outlet 46b into the oxygen-containing gas discharge path 72.

The fuel gas injection device 10 and the fuel cell system 11 according to this embodiment offer the following effects.

The total orifice equivalent diameter $S_T$ obtained by adding together the orifice equivalent diameter $S_{A1}$ of the first injection hole 86a of the first injector 86 and the orifice equivalent diameter $S_{A2}$ of the second injection hole 88a of the second injector 88, and the orifice equivalent diameter $S_{E1}$ of the third injection hole 98a of the nozzle 98 of the ejector 85 are set such that $S_{E1}<S_T$.

It is then possible to make the pressure of the fuel gas on the downstream side (in the space S) of the nozzle 98 effectively lower than the pressure of the fuel gas on the upstream side (in the inlet portion 94) of the nozzle 98. Thus, the gas flow speed passing through the nozzle 98 can be the speed of sound, and the circulation efficiency of the fuel exhaust gas can be improved.

The injector control portion 104 controls the respective operations of the first injector 86 and second injector 88 such that the fuel gas is simultaneously injected from the first injector 86 and second injector 88. It is thus possible to effectively supply a necessary amount of fuel gas to the fuel cell stack 12.

The flow path length and flow path sectional area from the first injector 86 to the nozzle 98 are substantially identical to the flow path length and flow path sectional area from the second injector 88 to the nozzle 98. This makes it possible to reduce variation in pressure loss of the fuel gas respectively from the first injector 86 and second injector 88 to the nozzle 98.

The ejector 85 includes the diffuser 100 disposed downstream of the nozzle 98, and the draw-in portion 96 for guiding the fuel exhaust gas into the space S between the nozzle 98 and diffuser 100. This makes it possible to efficiently supply the fuel gas and fuel exhaust gas into the fuel cell stack 12.

The present invention is not limited to the configurations described above. The fuel cell system 11 may include a fuel gas injection device 10a shown in FIG. 3. In the fuel gas injection device 10a of the modification, the same components as those of the above-described fuel gas injection device 10 will be labeled using the same reference numerals and will not be described in detail again.

Figure 3:
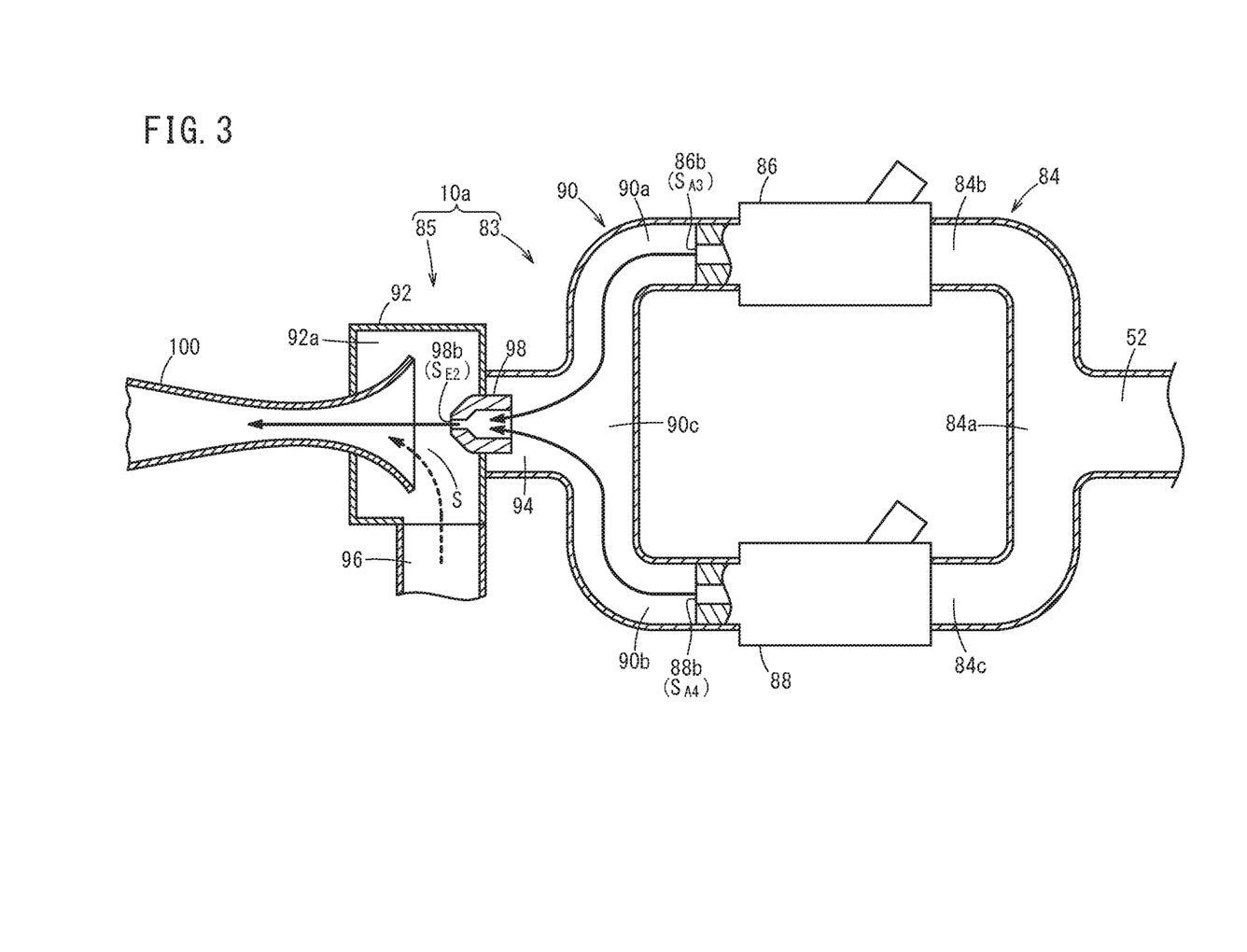
FIG. 3 is a schematic explanatory diagram showing the configuration of a fuel gas injection device according to a modification.

In the fuel gas injection device 10a, an orifice equivalent diameter $S_{A3}$ of the first injection hole 86b of the first injector 86 and an orifice equivalent diameter $S_{E2}$ of the third injection hole 98b of the nozzle 98 are set such that $S_{E2}<S_{A3}$. The orifice equivalent diameter $S_{A3}$ is the opening area of the first injection hole 86b multiplied by the flow coefficient of the first injector 86. The orifice equivalent diameter $S_{E2}$ is the opening area of the third injection hole 98b multiplied by the flow coefficient of the nozzle 98.

An orifice equivalent diameter $S_{A4}$ of the second injection hole 88b of the second injector 88 and the orifice equivalent diameter $S_{E2}$ of the third injection hole 98b of the nozzle 98 are set such that $S_{E2}<S_{A4}$. The orifice equivalent diameter $S_{A4}$ is the opening area of the second injection hole 88b multiplied by the flow coefficient of the second injector 88. The orifice equivalent diameter $S_{A3}$ and the orifice equivalent diameter $S_{A4}$ may be identical to each other or different from each other.

In such a fuel gas injection device 10a, the injector control portion 104 controls the respective operations of the first injector 86 and second injector 88 such that the first injector 86 and second injector 88 intermittently inject the fuel gas in an alternate manner, once at a time or multiple times at a time.

When the orifice equivalent diameter $S_{E2}$ is approximate to the orifice equivalent diameter $S_{A3}$ or orifice equivalent diameter $S_{A4}$, then the maximum supply flow rate of the fuel gas introduced from the ejector 85 into the fuel cell stack 12 (the maximum discharge flow rate of the nozzle 98) is substantially equal to the injection flow rate of the fuel gas of the first injector 86 or second injector 88. Accordingly, in such a case, it is preferable to set the orifice equivalent diameter $S_{E2}$ based on the maximum supply amount of the fuel gas introduced from the ejector 85 to the fuel cell stack 12 and the circulation efficiency of the fuel exhaust gas of the ejector 85.

Figure 4A:
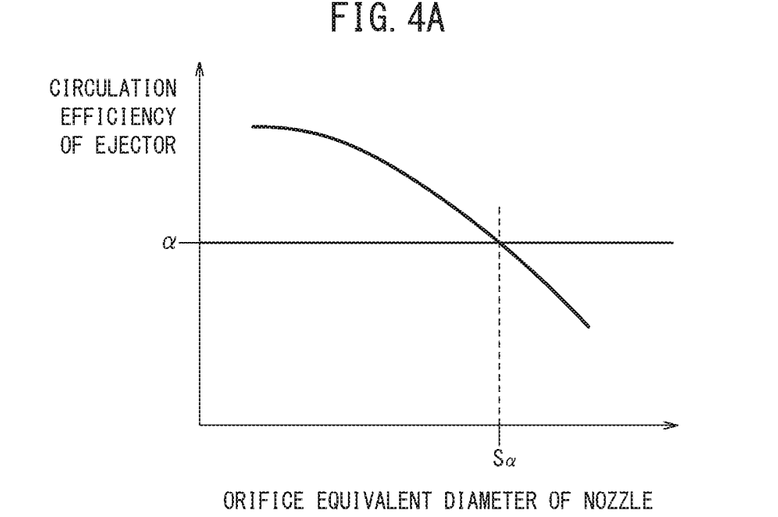
FIG. 4A is a graph used to explain a first threshold.
Figure 4B:
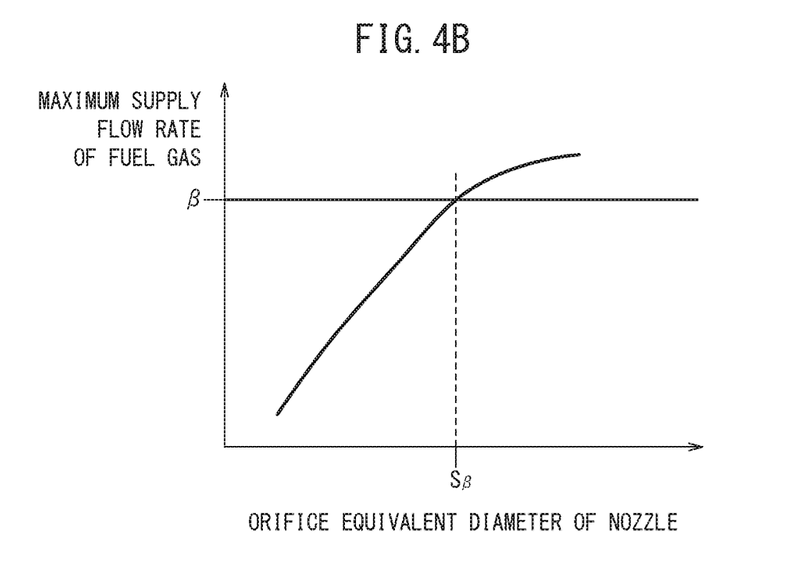
FIG. 4B is a graph used to explain a second threshold.

Specifically, it is preferable to set the orifice equivalent diameter $S_{E2}$ to be not less than a first threshold $S_\alpha$ nor more than a second threshold $S_\beta$ ($S_\alpha \leq S_{E2} \leq S_\beta$). The first threshold $S_\alpha$ is such an orifice equivalent diameter of the nozzle 98 that the circulation efficiency of the fuel exhaust gas of the ejector 85 corresponds to a lower limit value $\alpha$ of the required circulation efficiency (see FIG. 4A). The second threshold $S_\beta$ is such an orifice equivalent diameter of the nozzle 98 that the maximum supply flow rate of the fuel gas introduced from the ejector 85 into the fuel cell stack 12 corresponds to a lower limit value $\beta$ of the required maximum supply flow rate (see FIG. 4B).

According to the fuel gas injection device 10a, $S_{E2}<S_{A3}$ and $S_{E2}<S_{A4}$, so that the pressure of the fuel gas on the downstream side of the nozzle 98 can be effectively higher than the pressure of the fuel gas on the upstream side of the nozzle 98. Then, the gas flow speed passing through the nozzle 98 can be the speed of sound, and the circulation efficiency of the fuel exhaust gas is improved.

The fuel gas injection device and fuel cell system according to the present invention are not limited to the above-described embodiments, and can of course employ various configurations without departing from the scope of the present invention.

What is claimed is:

1. A fuel gas injection device disposed on a fuel gas supply path for supplying a fuel gas to a fuel cell, comprising:

a plurality of injectors arranged in parallel to each other; and an ejector including a nozzle that generates a negative pressure by discharging the fuel gas injected respectively from the plurality of injectors so as to draw-in a fuel exhaust gas discharged from the fuel cell and mix the fuel exhaust gas with the fuel gas, wherein a total orifice equivalent diameter $S_T$ obtained by adding together orifice equivalent diameters of respective injection holes of the plurality of injectors and an orifice equivalent diameter $S_E$ of an injection hole of the nozzle are set such that $S_E<S_T$.

2. The fuel gas injection device according to claim 1, further comprising an injector control unit configured to control operations of the plurality of injectors such that the fuel gas is injected simultaneously from the plurality of injectors.

3. The fuel gas injection device according to claim 1, wherein flow paths respectively from the plurality of injectors to the nozzle are configured such that lengths and flow path sectional areas are substantially identical to each other.

4. The fuel gas injection device according to claim 1, wherein the ejector comprises:
a diffuser disposed downstream of the nozzle; and
a draw-in portion for guiding the fuel exhaust gas into a space between the nozzle and the diffuser.

5. The fuel gas injection device according to claim 1, further comprising:
a plurality of sending out paths connected respectively to the plurality of injectors; and
a junction portion at which the plurality of sending out paths join together so that the fuel gas injected from the plurality of injectors is guided to the ejector.

6. A fuel gas injection device disposed on a fuel gas supply path for supplying a fuel gas to a fuel cell, comprising:
a plurality of injectors arranged in parallel to each other; and
an ejector including a nozzle that generates a negative pressure by discharging the fuel gas injected respectively from the plurality of injectors so as to draw-in a fuel exhaust gas discharged from the fuel cell and mix the fuel exhaust gas with the fuel gas,
wherein an orifice equivalent diameter $S_A$ of an injection hole of each of the plurality of injectors and an orifice equivalent diameter $S_E$ of an injection hole of the nozzle are set such that $S_E<S_A$.

7. The fuel gas injection device according to claim 6, further comprising an injector control unit configured to control operations of the plurality of injectors such that the fuel gas is injected intermittently from the plurality of injectors in an alternate manner, once at a time or multiple times at a time.

8. The fuel gas injection device according to claim 6, wherein flow paths respectively from the plurality of injectors to the nozzle are configured such that lengths and flow path sectional areas are substantially identical to each other.

9. The fuel gas injection device according to claim 6, wherein the ejector comprises:
a diffuser disposed downstream of the nozzle; and
a draw-in portion for guiding the fuel exhaust gas into a space between the nozzle and the diffuser.

10. The fuel gas injection device according to claim 6, further comprising:
a plurality of sending out paths connected respectively to the plurality of injectors; and a junction portion at which the plurality of sending out paths join together so that the fuel gas injected from the plurality of injectors is guided to the ejector.

11. A fuel cell system comprising a fuel cell, a fuel gas supply path for supplying a fuel gas to the fuel cell, and a fuel gas injection device disposed on the fuel gas supply path,
the fuel gas injection device comprising:
a plurality of injectors arranged in parallel to each other; and
an ejector including a nozzle that generates a negative pressure by discharging the fuel gas injected respectively from the plurality of injectors so as to draw-in a fuel exhaust gas discharged from the fuel cell and mix the fuel exhaust gas with the fuel gas,
wherein a total orifice equivalent diameter $S_T$ obtained by adding together orifice equivalent diameters of respective injection holes of the plurality of injectors and an orifice equivalent diameter $S_E$ of an injection hole of the nozzle are set such that $S_E<S_T$.

12. The fuel cell system according to claim 11, further comprising an injector control unit configured to control operations of the plurality of injectors such that the fuel gas is injected simultaneously from the plurality of injectors.

13. The fuel cell system according to claim 11, wherein flow paths respectively from the plurality of injectors to the nozzle are configured such that lengths and flow path sectional areas are substantially identical to each other.

14. The fuel cell system according to claim 11, wherein the ejector comprises:
a diffuser disposed downstream of the nozzle; and
a draw-in portion for guiding the fuel exhaust gas into a space between the nozzle and the diffuser.

15. The fuel cell system according to claim 11, further comprising:
a plurality of sending out paths connected respectively to the plurality of injectors; and
a junction portion at which the plurality of sending out paths join together so that the fuel gas injected from the plurality of injectors is guided to the ejector.

16. A fuel cell system comprising a fuel cell, a fuel gas supply path for supplying a fuel gas to the fuel cell, and a fuel gas injection device disposed on the fuel gas supply path,
the fuel gas injection device comprising:
a plurality of injectors arranged in parallel to each other; and
an ejector including a nozzle that generates a negative pressure by discharging the fuel gas injected respectively from the plurality of injectors so as to draw-in a fuel exhaust gas discharged from the fuel cell and mix the fuel exhaust gas with the fuel gas,
wherein an orifice equivalent diameter $S_A$ of an injection hole of each of the plurality of injectors and an orifice equivalent diameter $S_E$ of an injection hole of the nozzle are set such that $S_E<S_A$.

17. The fuel cell system according to claim 16, further comprising an injector control unit configured to control operations of the plurality of injectors such that the fuel gas is injected intermittently from the plurality of injectors in an alternate manner, once at a time or multiple times at a time.

18. The fuel cell system according to claim 16, wherein flow paths respectively from the plurality of injectors to the nozzle are configured such that lengths and flow path sectional areas are substantially identical to each other.

19. The fuel cell system according to claim 16, wherein the ejector comprises:

a diffuser disposed downstream of the nozzle; and
a draw-in portion for guiding the fuel exhaust gas into a space between the nozzle and the diffuser.

20. The fuel cell system according to claim 16, further comprising:
a plurality of sending out paths connected respectively to the plurality of injectors; and
a junction portion at which the plurality of sending out paths join together so that the fuel gas injected from the plurality of injectors is guided to the ejector.

* * * * *